(12) United States Patent
Harmon et al.

(10) Patent No.: US 7,583,062 B2
(45) Date of Patent: Sep. 1, 2009

(54) METHOD AND SYSTEM FOR PROTECTING VOLTAGE REGULATOR DRIVER CIRCUITRY DURING FIELD COIL SHORT CIRCUIT CONDITION

(75) Inventors: Jack D. Harmon, Carmel, IN (US); Mingshe Zhou, Norman, OK (US); Jim Phillips, Mustang, OK (US)

(73) Assignee: Reny International, Inc., Anderson, IN (US)

( * ) Notice: Subject to any disclaimer, the term of this patent is extended or adjusted under 35 U.S.C. 154(b) by 389 days.

(21) Appl. No.: 11/539,425

(22) Filed: Oct. 6, 2006

(65) Prior Publication Data

US 2008/0084191 A1   Apr. 10, 2008

(51) Int. Cl.
*H02H 11/00* (2006.01)
*H02P 9/00* (2006.01)
(52) U.S. Cl. .............................. 322/24; 322/28; 322/44
(58) Field of Classification Search .................. 322/24, 322/26, 28, 44; 361/97; 323/272, 287, 284, 323/276
See application file for complete search history.

(56) References Cited

U.S. PATENT DOCUMENTS

| 5,189,360 | A | * | 2/1993 | Schwartz et al. | 322/25 |
|---|---|---|---|---|---|
| 5,617,011 | A | * | 4/1997 | Hammer et al. | 322/28 |
| 5,990,666 | A | | 11/1999 | Sekiya et al. | |
| 6,153,945 | A | * | 11/2000 | Koss et al. | 307/10.1 |
| RE37,609 | E | | 3/2002 | Bittner | |
| 6,462,517 | B2 | | 10/2002 | Asada | |
| 6,664,767 | B2 | | 12/2003 | Takahashi et al. | |
| 6,700,356 | B1 | * | 3/2004 | Dorn | 322/44 |
| 7,102,336 | B2 | | 9/2006 | Adachi | |
| 2001/0009363 | A1 | * | 7/2001 | Rice et al. | 322/28 |
| 2004/0108840 | A1 | | 6/2004 | Morrissette | |
| 2006/0043955 | A1 | | 3/2006 | Hung | |
| 2006/0049808 | A1 | * | 3/2006 | Yao | 322/25 |

* cited by examiner

*Primary Examiner*—Julio C. Gonzalez
(74) *Attorney, Agent, or Firm*—Cantor Colburn LLP

(57) ABSTRACT

A method for protecting voltage regulator driver circuitry during a short circuit condition of an alternator field coil includes passively detecting a drop in field coil voltage during an on-portion of a duty cycle of the field coil voltage, wherein the passive detection of the drop in field coil voltage signifies an interrupt event. Responsive to the interrupt event, a logical state of a driver enable control signal is changed so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry.

9 Claims, 4 Drawing Sheets

METHOD AND SYSTEM FOR PROTECTING VOLTAGE REGULATOR DRIVER CIRCUITRY DURING FIELD COIL SHORT CIRCUIT CONDITION

BACKGROUND

The present invention relates generally to rotating electric machinery and, more particularly, to a method and system for protecting voltage regulator driver circuitry during a field coil short circuit condition.

Generators are found in virtually every motor vehicle manufactured today. These generators, also referred to as alternators, produce electricity necessary to power a vehicle's electrical accessories, as well as to charge a vehicle's battery. Generators must also provide the capability to produce electricity in sufficient quantities so to power a vehicle's electrical system in a manner that is compatible with the vehicle's electrical components. The alternator or generator typically uses a voltage regulator to regulate the charging voltage and output current in order to provide consistent operation during varying loads that would otherwise create voltage drops and other operational problems. Presently, conventional vehicle charging systems may utilize a voltage regulator having either a discrete transistor or, alternatively, a custom integrated circuit known as an Application Specific Integrated Circuit (ASIC).

Still other vehicle designs may also employ voltage regulators with advanced microprocessor functions that maintain a highly accurate regulated voltage produced by a generator. Microprocessor based regulators may also include advanced clock and memory circuits that store battery and power supply reference data, battery voltage and generator rotation speed, as well determine how much the battery is being charged and at what rate at any point in time.

In operation of a vehicle alternator, it is possible that the field coil used to generate the magnetic field of the rotor portion of the alternator may become short-circuited. In such a case, the voltage regulator driver circuitry should be deactivated in order to discontinue the flow of field current through the driver devices until such time as the short circuit condition is cleared. Conventionally, such short circuit protection (when provided at all) involves use of a number of components, such as (for example) a small shunt resistance within the field coil path and an analog voltage comparator to determine whether the voltage across the shunt resistor exceeds a nominal voltage when the field coil is not short circuited. Accordingly, it would be desirable to be able to provide short circuit protection for voltage regulator driver circuitry in a manner that results in fewer hardware components and/or reduced component costs.

SUMMARY

The foregoing discussed drawbacks and deficiencies of the prior art are overcome or alleviated by, in an exemplary embodiment, a method for protecting voltage regulator driver circuitry during a short circuit condition of an alternator field coil, including passively detecting a drop in field coil voltage during an on-portion of a duty cycle of the field coil voltage, wherein the passive detection of the drop in field coil voltage signifies an interrupt event; and responsive to the interrupt event, changing a logical state of a driver enable control signal so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry.

In still another embodiment, a storage medium includes a computer readable computer program code for protecting voltage regulator driver circuitry during a short circuit condition of an alternator field coil, and instructions for causing a computer to implement a method. The method further includes passively detecting a drop in field coil voltage during an on-portion of a duty cycle of the field coil voltage, wherein the passive detection of the drop in field coil voltage signifies an interrupt event; and responsive to the interrupt event, changing a logical state of a driver enable control signal so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry.

In still another embodiment, a voltage regulator for an electrical generator includes an electronic device configured to compare an output voltage of the generator to a desired set point voltage thereof, driver circuitry in communication with the electronic device, the driver circuitry configured to selectively activate and deactivate a switching device used to pass field current through a field coil, in response to a difference between the output voltage and the desired set point voltage; one or more components configured to passively detect a drop in field coil voltage during an on-portion of a duty cycle of the field coil voltage, wherein the passive detection of the drop in field coil voltage signifies an interrupt event; and the electronic device further configured to protect the driver circuitry and switching device during a field coil short circuit condition by changing a logical state of a driver enable control signal, responsive to the interrupt event, so as to deactivate the driver circuitry and prevent the switching device from passing current regardless of the state of a pulse width modulation (PWM) control signal applied to the driver circuitry.

In still another embodiment, a vehicle charging system includes an alternator having one or more stator windings on a stationary portion thereof and a field coil on a rotatable portion thereof. A voltage regulator is configured to regulate an output voltage of the alternator through control of a field current through the field coil. The voltage regulator further includes an electronic device configured to compare an output voltage of the alternator to a desired set point voltage thereof; driver circuitry in communication with the electronic device, the driver circuitry configured to selectively activate and deactivate a switching device used to pass field current through the field coil; one or more components configured to passively detect a drop in field coil voltage during an on-portion of a duty cycle of the field coil voltage, wherein the passive detection of the drop in field coil voltage signifies an interrupt event; and the electronic device further configured to protect the driver circuitry and switching device during a field coil short circuit condition by changing a logical state of a driver enable control signal, responsive to the interrupt event, so as to deactivate the driver circuitry and prevent the switching device from passing current regardless of the state of a pulse width modulation (PWM) control signal applied to the driver circuitry.

BRIEF DESCRIPTION OF THE DRAWINGS

Referring to the exemplary drawings wherein like elements are numbered alike in the several Figures.

DETAILED DESCRIPTION

Disclosed herein is a method and system for protecting voltage regulator driver circuitry during a field coil short circuit condition. Briefly stated, a voltage regulator (e.g., microprocessor based) is configured with the capability of sensing a field coil short circuit condition through a simple (resistor/diode) combination of passive components, and thereby generating an interrupt signal that disables the driver circuitry associated with the field coil. Further, when implemented at least in part in software, the present techniques do not require more expensive hardware (e.g., differential amplifiers) configured within the ECM and/or voltage regulator.

Figure 1:
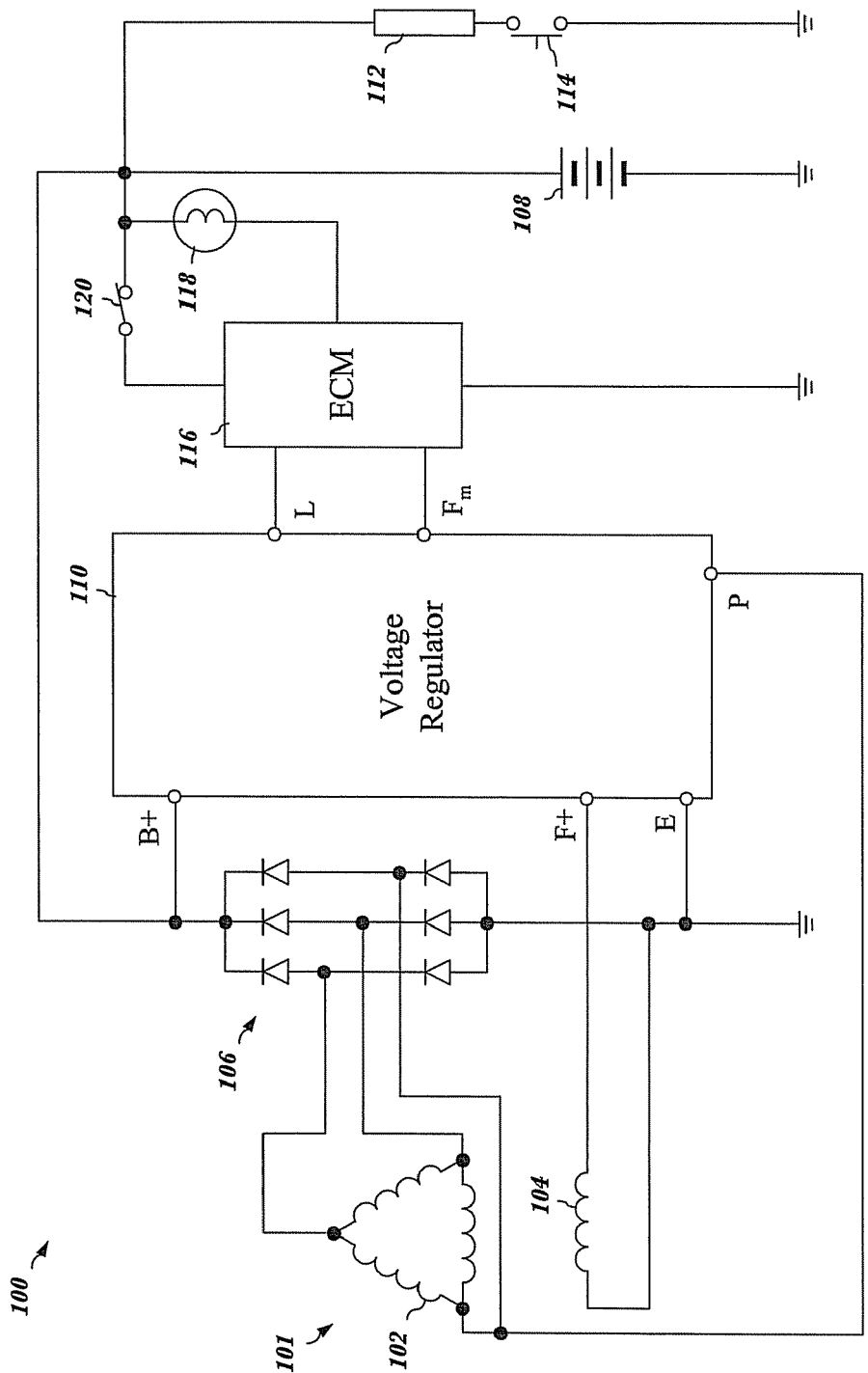
FIG. 1 is a schematic diagram of an exemplary vehicle charging system employing a microprocessor based voltage regulator, suitable for use in accordance with an embodiment of the invention.

Referring initially to FIG. 1, there is shown a schematic diagram of an exemplary vehicle charging system 100 employing a microprocessor based voltage regulator, suitable for use in accordance with an embodiment of the invention. It should be appreciated that although FIG. 1 depicts a vehicle charging system, the present embodiments are applicable to other types of regulated generator systems. A vehicle alternator 101 has a plurality of windings 102 (e.g., three-phase, delta configuration) in a stator portion thereof, and a field coil 104 in a rotor portion thereof. The alternating current (AC) voltage generated in the windings 102 is converted to a direct current (DC) voltage by a full-wave rectifier 106, which in turn includes three diode-pairs configured in parallel. The DC output of the rectifier 106 is fed to the positive terminal of a vehicle battery 108, wherein the magnitude of the output voltage is dependent upon the speed of the rotor and the amount of field current supplied to the field coil 104.

In certain alternator designs, the stator may actually include independent pairs of stator windings and an associated pair of rotor field coils to reduce noise in view of increased load escalation. However, for purposes of simplicity, only one set of stator windings and field coil is illustrated. It will also be appreciated that the windings 102 could alternatively be connected in a Y-configuration having a common neutral point.

As further illustrated in FIG. 1, a voltage regulator 110 is utilized to regulate and control the magnitude of the output voltage generated by the alternator 101, and thus control the (direct current) charging voltage applied to the battery 108 and associated vehicle loads (e.g., load 112 connected through switch 114). It does so by controlling the magnitude of field current supplied to field coil 104 through high-side alternator terminal "F+" shown in FIG. 1. Additional details concerning the generation of current through the field coil 104 by regulator 110 are discussed in further detail hereinafter.

One skilled in the art may also recognize other standardized terminals associated with the alternator, including: the high-side battery output terminal "B+", the phase voltage terminal "P" used to monitor the AC output voltage of the alternator; and the ground terminal "E" used to provide a ground connection for the alternator. An electronic control module 116 (ECM), which may represent the vehicle's main computer, receives a charge warning lamp signal through lamp terminal "L" of the regulator 110, used to control a charge warning lamp 118 when ignition switch 120 is closed. The ECM 116 also receives a rotor switching signal through terminal "$F_m$", indicative of the field current signal F+ applied to the field coil 104.

Figure 2:
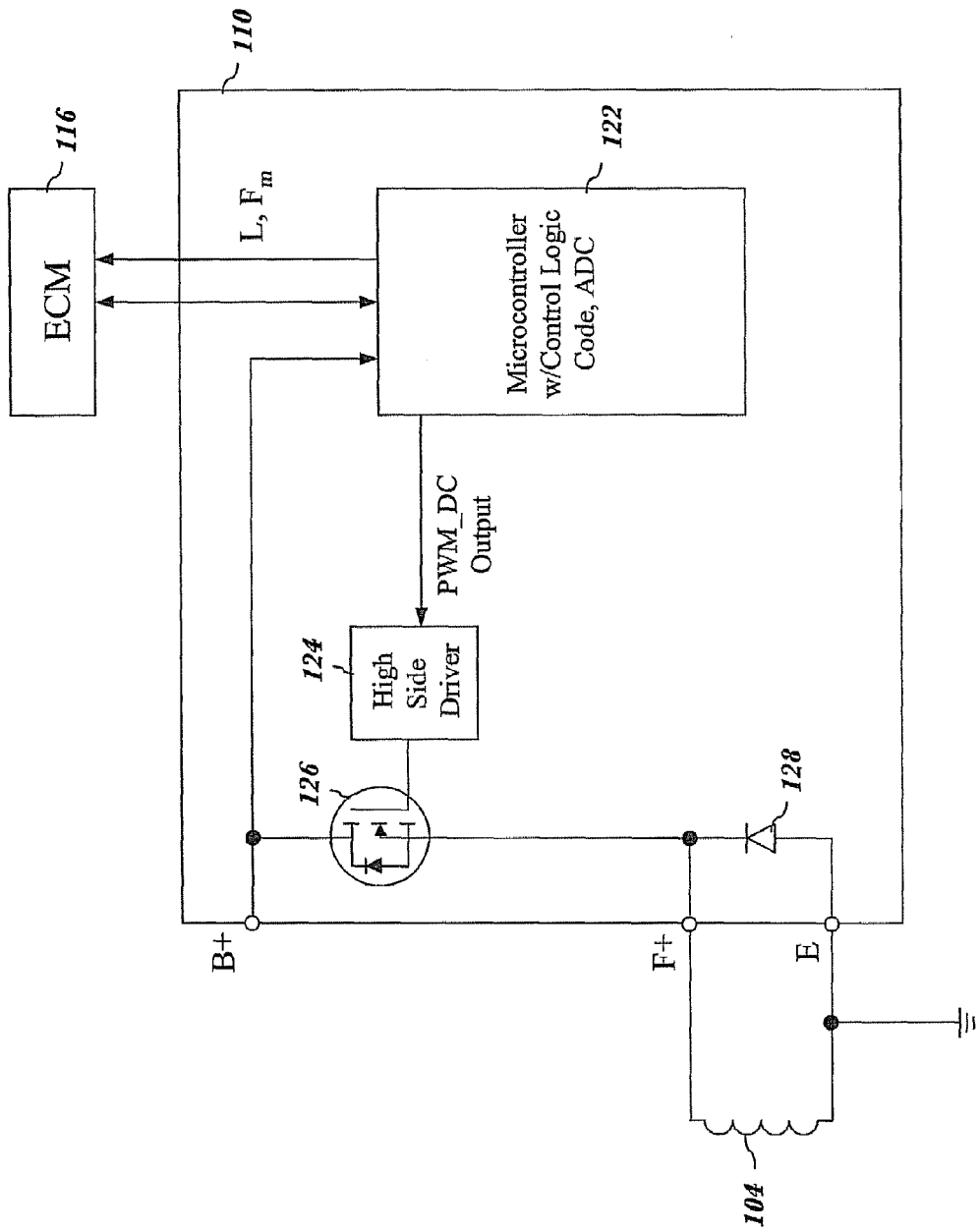
FIG. 2 is a more detailed schematic diagram of the voltage regulator shown in FIG. 1.

Referring now to FIG. 2, a more detailed schematic diagram of at least portions of the voltage regulator 110 of FIG. 1 is illustrated. For purposes of simplification, various discrete electronic components (e.g., resistors, capacitors, etc.) of the regulator 110 are not depicted in FIG. 2. A microcontroller 122 having control logic code therein receives feedback of the alternator charging system voltage(s) in digital form through an internal analog-to-digital converter (ADC) configured therein. Based on a comparison between the sensed system voltage and a predetermined set operating voltage of the system, the microcontroller generates a PWM output signal (PWM_DC) that is coupled to a high-side driver 124. The high-side driver 124 in turn provides a pulsed switching signal to the control terminal (e.g., gate) of transistor 126. Based on the duty cycle of the pulsed signal, the on/off switching of transistor causes field current to intermittently flow through field coil 104. During "off" periods of the duty cycle, energy within the field coil is dissipated through a flyback diode 128.

As indicated above, the regulator 110 attempts to maintain a predetermined charging system voltage level (set point). When the charging system voltage falls below this point, the regulator 110 increases the level of field current by increasing the duty cycle of the PWM_DC current. Conversely, when the charging system voltage increases above the system set point, the 110 decreases the level of field current by decreasing the duty cycle of the PWM_DC current.

Figure 3:
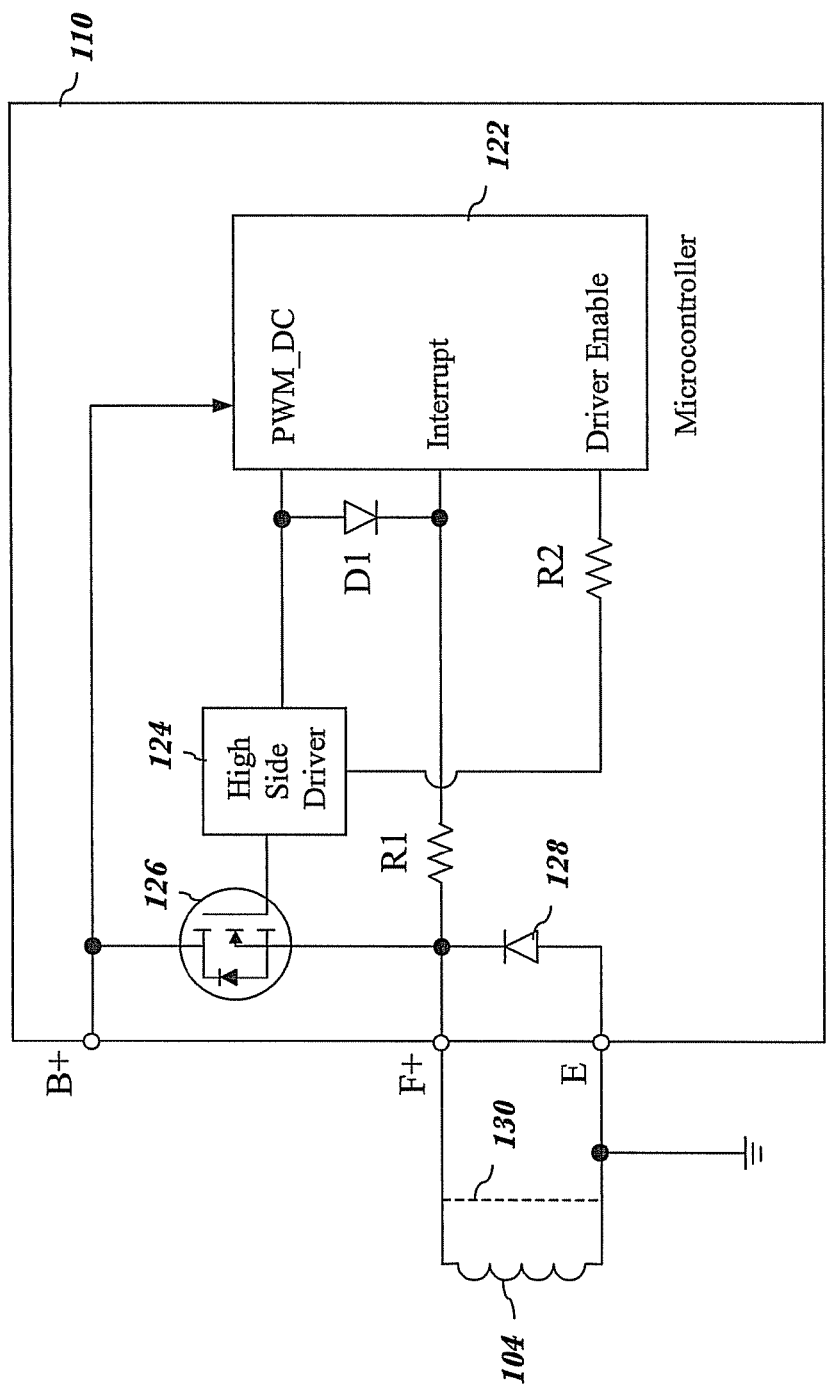
FIG. 3 is a more detailed schematic diagram of the voltage regulator of FIGS. 1 and 2, illustrating a method for protecting voltage regulator driver circuitry during a field coil short circuit condition, in accordance with an embodiment of the invention.

As further indicated above, it is possible for the field coil 104 to become short-circuited during operation of the alternator 101 due to, for example, the presence of metal shavings in the rotor. Accordingly, FIG. 3 is a more detailed schematic diagram of the voltage regulator shown in FIGS. 1 and 2, illustrating a system and method for protecting voltage regulator driver circuitry during a field coil short circuit condition, in accordance with an embodiment of the invention. From a hardware perspective, a simple resistor/diode combination is used to passively detect a field coil short circuit condition, combined with the use of internal microprocessor software to generate a command that deactivates the high-side driver 124.

More specifically, a resistor R1 is configured in series between the high-side alternator terminal F+ and an input pin of the microcontroller 122, designated as "Interrupt" in FIG. 3. In addition, a diode D1 is configured between the PWM output pin (PWM_DC) of the microcontroller 122 and the "Interrupt" input pin, wherein a forward biasing of the diode D1 couples the voltage on the PWM_DC output pin to the "Interrupt" input pin of the microcontroller 122. Under normal operating conditions, the output signal on PWM_DC has the same duty cycle, but opposite phase, as the output voltage of the field coil. A logical low signal applied to the input of the high-side driver 124 in turn drives the gate of an N-channel MOSFET device 126 high. The high-side driver 124 is thus "active low" in that the transistor 126 is rendered conductive when the output voltage of the PWM_DC pin is logical low (e.g., 0 volts), assuming that the high-side driver is actively enabled in the first place. In this regard, a "Driver Enable"

output signal of the microcontroller 122 is coupled to the high side driver 124 through a resistor R2, which selectively activates or deactivates the high-side driver 124, depending on whether or not normal operating conditions exist.

So long as normal operating conditions exist, the voltage on the "Interrupt" input pin of the microcontroller 122 remains at logic high, and the internal logic and/or software of the microcontroller 122 maintains the "Driver Enable" output signal at active low. On the other hand, during a short circuit of the field coil 104 (indicated by the dashed line 130 in FIG. 3), the voltage on the "Interrupt" input pin of the microcontroller 122 transitions to logic low due to the short. The internal logic and/or software of the microcontroller 122 detects a falling edge transition of the "Interrupt" pin voltage, and switches the "Driver Enable" output signal logic high, thereby disabling the high-side driver 124 and preventing any field current from flowing through the transistor 126 until such time as the short circuit condition is cleared.

Figure 4:
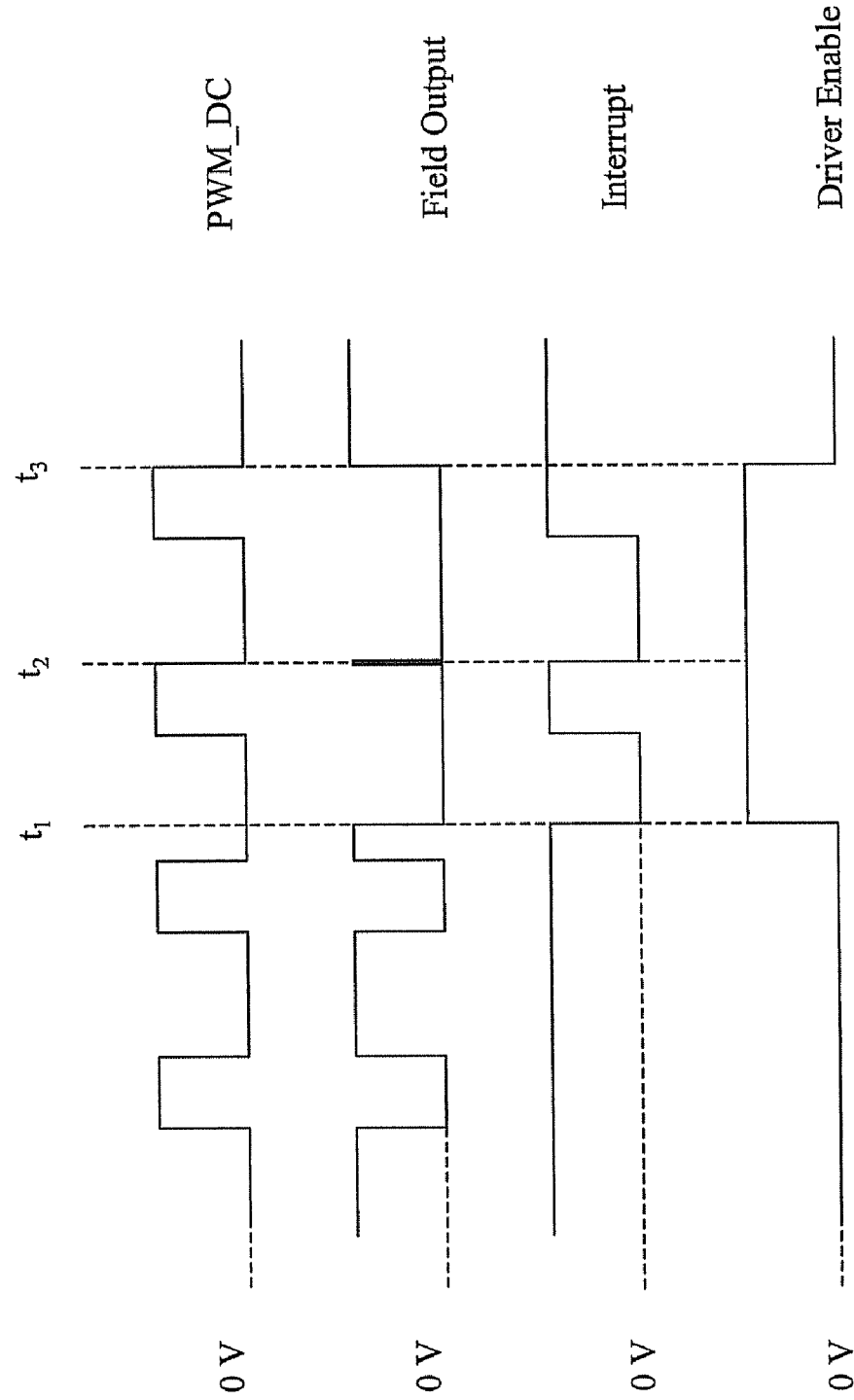
FIG. 4 is a waveform diagram depicting an exemplary operating scenario of the protection circuitry shown in FIG. 3.

FIG. 4 is a waveform diagram depicting an exemplary operating scenario of the protection circuitry shown in FIG. 3. As is shown, the four waveforms depicted in FIG. 4 are the PWM_DC output signal of the microcontroller 122, the field output voltage at F+, the voltage of the "Interrupt" input pin of the microcontroller 122, and the voltage of the "Driver Enable" output pin of the microcontroller 122. Prior to time $t_1$, the regulator is in a normal operating condition, in that there is no short circuit condition across the field coil 104. During the "off" portions of the PWM_DC duty cycle, the field output voltage is high, which in turn keeps the voltage at the "Interrupt" pin at high. Moreover, during the "on" portions of the PWM_DC duty cycle (when the field output voltage is low), the voltage at the "Interrupt" pin at still maintained at logic high, notwithstanding the discharged voltage at F+, due to the combination of D1 and R1. So long as the microcontroller 122 does not detect a falling transition of the logical high voltage at the "Interrupt" input pin, it will maintain the "Driver Enable" output pin at an active low logic level.

However, at time $t_1$, a short circuit condition now exists across the field coil 104, so as to result in the field output voltage immediately falling to 0 volts. Because this coincides with the "off" portion of the duty cycle of PWM_DC, there is no signal voltage present on PWM_DC that would allow R1 and D1 from preventing the voltage at the "Interrupt" input pin from discharging to logic low. Consequently, the microcontroller 122 switches the "Driver Enable" signal from logic low to logic high, thereby deactivating the high-side driver 124.

Between time $t_1$ and $t_2$, it will be noted that the next "on" portion of the PWM_DC duty cycle is reached. Correspondingly, the voltage on the "Interrupt" pin is at least temporarily restored to logic high. However, this brief rise is not yet enough information for the microcontroller 120 to determine whether the short circuit condition has been eliminated because the field coil voltage would nominally be 0 at this point in the duty cycle, even under normal conditions. Accordingly, assuming that the short circuit condition still exists by the next "off" portion of the PWM_DC duty cycle at time $t_2$, FIG. 4 further illustrates a falling edge in input voltage of the "Interrupt" pin and a brief pulse in the output voltage at F+, coinciding with the transition of the PWM_DC signal to low. This represents a short circuit attempt at pulling down the "Interrupt" pin voltage through the resistor (R1) coupling with PWM_DC. However, the voltage coupled to the "Interrupt" pin is quickly discharged through R1 and the shorted out field coil 104. Therefore, because the voltage at the "Interrupt" pin was not maintained during the "off" portion of the PWM_DC duty cycle, the microcontroller 120 does not restore the "Driver Enable" output pin to active low logic level at this point.

It is then assumed that the short circuit condition is cleared by time $t_3$, corresponding to the next "off" portion of the duty cycle of PWM_DC. At this point, the voltage at the "Interrupt" pin is still maintained high immediately after PWM_DC goes low, since the field coil is no longer shorted out and can prevent current from instantaneously discharging the "Interrupt" pin voltage. The microcontroller 122 therefore detects this condition and resets the "Driver Enable" signal back to active low so that the high-side driver 124 can turn on transistor 126, passing current through the field coil 104 and generating the output voltage thereon.

Although the exemplary method and system outlined above is depicted as being implemented in software within the microcontroller 122, one skilled in the art will also appreciate that the logic can also be implemented through hardware configured within an ASIC type regulator, for instance. In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for protecting voltage regulator driver circuitry during a short circuit condition of an alternator field coil, the method comprising:

passively detecting a drop in field coil voltage during an on-portion of a duty cycle of the field coil voltage, wherein the passive detection of the drop in field coil voltage signifies an interrupt event; and responsive to the interrupt event, changing a logical state of a driver enable control signal so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry, wherein the PWM control signal and the driver enable control signal are generated by a microcontroller included within a voltage regulator, and wherein the passive detection of a drop in field coil voltage is implemented through an input pin of the microcontroller;

the voltage regulator further comprising a first resistor coupled between a positive side of the field coil and the input pin of the microcontroller, and a diode configured between a first output pin of the microcontroller corresponding to the PWM control signal and the input pin of the microcontroller.

2. The method of claim 1, wherein diode coupling between the PWM control signal and the input pin of the microcontroller prevents false detection of the interrupt event during an off-portion of a duty cycle of the field coil voltage when no short circuit condition exists.

3. The method of claim 2, further comprising changing the logical state of the driver enable control signal so as to reactivate the driver circuitry in the event the short circuit condition is eliminated.

4. The method of claim 3, wherein the diode coupling between the PWM control signal and the input pin of the microcontroller maintains the voltage of the input pin of the microcontroller at a logical high value during the off-portion of the duty cycle of the field coil voltage.

5. A storage medium, comprising:
a computer readable computer program code for protecting voltage regulator driver circuitry during a short circuit condition of an alternator field coil; and
instructions for causing a computer to implement a method, the method further comprising:
passively detecting a drop in field coil voltage during an on-portion of a duty cycle of the field coil voltage, wherein the passive detection of the drop in field coil voltage signifies an interrupt event;
responsive to the interrupt event, changing a logical state of a driver enable control signal so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry, wherein the PWM control signal and the driver enable control signal are generated by a microcontroller included within a voltage regulator; and
changing the logical state of the driver enable control signal so as to reactivate the driver circuitry in the event the short circuit condition is eliminated.

6. A storage medium, comprising:
a computer readable computer program code for protecting voltage regulator driver circuitry during a short circuit condition of an alternator field coil; and
instructions for causing a computer to implement a method, the method further comprising:
passively detecting a drop in field coil voltage during an on-portion of a duty cycle of the field coil voltage, wherein the passive detection of the drop in field coil voltage signifies an interrupt event; and
responsive to the interrupt event, changing a logical state of a driver enable control signal so as to deactivate driver circuitry associated with a switching device used to pass field current through the field coil, wherein the driver circuitry, when deactivated, prevents the switching device from passing current regardless of the state of a pulse width modulation (PWM) control signal applied to the driver circuitry, wherein the PWM control signal and the driver enable control signal are generated by a microcontroller included within a voltage regulator, and wherein the passive detection of a drop in field coil voltage is implemented through an input pin of the microcontroller;
the voltage regulator further comprising a first resistor coupled between a positive side of the field coil and the input pin of the microcontroller, and a diode configured between a first output pin of the microcontroller corresponding to the PWM control signal and the input pin of the microcontroller.

7. The storage medium of claim 6, wherein diode coupling between the PWM control signal and the input pin of the microcontroller prevents false detection of the interrupt event during an off-portion of a duty cycle of the field coil voltage when no short circuit condition exists.

8. The storage medium of claim 7, wherein the method further comprises changing the logical state of the driver enable control signal so as to reactivate the driver circuitry in the event the short circuit condition is eliminated.

9. The storage medium of claim 8, wherein the diode coupling between the PWM control signal and the input pin of the microcontroller maintains the voltage of the input pin of the microcontroller at a logical high value during the off-portion of the duty cycle of the field coil voltage.

* * * * *